US009508282B2

(12) United States Patent
Hussain (10) Patent No.: US 9,508,282 B2
(45) Date of Patent: Nov. 29, 2016

(54) VIRTUALIZED DISPLAY OUTPUT PORTS CONFIGURATION

(71) Applicant: ATI Technologies ULC, Markham (CA)

(72) Inventor: Syed Athar Hussain, Scarborough (CA)

(73) Assignee: ATI Technologies ULC, Markham, Ontario (CA)

( * ) Notice: Subject to any disclaimer, the term of this patent is extended or adjusted under 35 U.S.C. 154(b) by 14 days.

(21) Appl. No.: 14/565,583

(22) Filed: Dec. 10, 2014

(65) Prior Publication Data

US 2016/0171925 A1    Jun. 16, 2016

(51) Int. Cl.
*G06F 3/00* (2006.01)
*G06F 13/00* (2006.01)
*G06F 13/12* (2006.01)
*G09G 3/20* (2006.01)
*G06F 13/38* (2006.01)

(52) U.S. Cl.
CPC ........... *G09G 3/2096* (2013.01); *G06F 13/387* (2013.01); *G09G 2310/08* (2013.01); *G09G 2370/10* (2013.01)

(58) Field of Classification Search
None
See application file for complete search history.

(56) References Cited

U.S. PATENT DOCUMENTS

| | | | | |
|---|---|---|---|---|
| 2009/0278763 | A1* | 11/2009 | Zeng | G06F 3/1431 345/1.1 |
| 2012/0063376 | A1 | 3/2012 | Kambhatla et al. | |
| 2012/0066425 | A1* | 3/2012 | Zeng | G06F 13/00 710/303 |
| 2012/0079162 | A1* | 3/2012 | Jaramillo | G09G 5/006 710/316 |
| 2014/0055476 | A1 | 2/2014 | Wang | |
| 2014/0132835 | A1 | 5/2014 | Ma | |
| 2015/0281743 | A1* | 10/2015 | Yi | H04N 19/89 375/240.27 |

OTHER PUBLICATIONS

Video Electronics Standards Association, VESA DisplayPort Standard, Version 1, Revision 2a, May 23, 2012, 554 pgs., Newark, CA, U.S.A.
Video Electronics Standards Association, MST Use Case Example, Version 1, Jan. 18, 2011, 71 pgs., Newark, CA, U.S.A.
Kobayashi, "Displayport™ Ver.1.2 Overview", Displayport Developer Conference, Dec. 6, 2010, Retrieved From the Internet: http://www.vesa.org/wp-content/uploads/2010/12/DisplayPort-DevCon-Presentation-DP-1.2-Dec-2010-rev-2b.pdf.
Wiley,"Driving Multiple Displays From a Single Displayport Output", Displayport, Retrieved From the Internet: http://www.displayport.org/cables/driving-multiple-displays-from-a-single-displayport-output/.
Denicolai, "All You Need to Know About Displayport™", UNIGRAF, Mar. 2009.
Wiley, "Displayport Technical Overview", IEEE International Conference on Consumer Electronics (ICCE) Advances and Challenges in HD Interconnects, Jan. 10, 2011.
Vesa, "Displayport V1.3 Feature Summary", Sep. 18, 2014, Retrieved From the Internet http://www.displayport.org/wp-content/uploads/2014/09/dp-1.3-Overview-for-VESA-v1.pdf.
Crepps et al., "Understanding Multi-Stream", VESA Displayport Workshop, Taipei, May 2013.

(Continued)

*Primary Examiner* — David E Martinez
(74) *Attorney, Agent, or Firm* — Volpe and Koenig, P.C.

(57) ABSTRACT

A virtualized DisplayPort (DP) configuration data (DPCD) for multi-stream transport (MST) logical DP end points and non-DP end points allows DPCD configuration for links within a DisplayPort topology which are not configurable using DPCD. A virtualized DPCD may configure a link to an internal display of a MST sink device or a non-DP display to receive data using a dynamic refresh rate (DRR), display stream compression (DSC), panel self-refresh (PSR) and other DPCD configurable features.

48 Claims, 4 Drawing Sheets

(56) References Cited

OTHER PUBLICATIONS

Smith, "VESA Adds Adaptive-Sync to Displayport 1.2A Standard; Variable Refresh Monitor Move Forward", Anandtech, May 12, 2014, Retrieved From the Internet: http://www.anandtech.com/show/8008/vesa-adds-adaptivesync-to-displayport-12a-standard-variable-refresh-monitors-move-forward.

Smith, "VESA Releases Displayport 1.3 Standard: 50% More Bandwidth, New Features", Anandtech, Sep. 16, 2014, Retrieved From the Internet: http://www.anandtech.com/show/8533/vesa-releases-displayport-13-standard-50-more-bandwidth-new-features.

\* cited by examiner

VIRTUALIZED DISPLAY OUTPUT PORTS CONFIGURATION

FIELD OF INVENTION

The invention relates to the field of electronic visual displays and, more particularly, the virtualization of display output ports configuration.

BACKGROUND

Since the early days of computing and television, electronic visual displays have been commonly used to provide data output from computing or communications devices in a form that is easily discernable to users. Such displays are often referred to as monitors. Contemporary monitors are typically flat liquid crystal display (LCD) panels configured to receive a signal from a computing device for display as video, although many display technologies have been used and these technologies continue to evolve.

Monitors receive data for display from an output interface of the communications or communications source device. The display data may be formatted according to a particular video standard. Many video standards have been and continue to be in use, including composite video, video graphics array ("VGA"), Digital Video Interface ("DVI"), Serial Digital Interface ("SDI"), High-Definition Multimedia Interface "HDMI", And DisplayPort™ (as promulgated by the Video Electronics Standard Association, "VESA").

Monitors are usually limited in size due to cost or manufacturing limitations. Accordingly, in some applications it is desirable to display output from a particular computing device using more than one monitor in order to visualize the output. According to earlier video standards, routing a signal from a single output connector to a plurality of monitors using a splitter or other hub device would result in display of the same output on each monitor. In order for a source device to display different output to each connected monitor using such standards, it is typically necessary for the source device to generate separate video output streams and to provide a separate output connector on the source device to deliver a separate stream to each monitor for display. This may require additional connectors and hardware to be added to a motherboard or video processing card for example, which may occupy additional panel and enclosure space and may be undesirable, especially in small form devices such as laptop computers and smartphones.

The DisplayPort™ standard ("DP") in contrast relies on packetized data transmission from the source to the monitor. As used herein, DisplayPort and DP refer to the DisplayPort v1.2 standard issued by the Video Electronics Standards Association (VESA), which is incorporated by reference in its entirety as if fully set forth herein, and other protocol standards and versions forward or backward compatible therewith. Packetized data transmission allows DP to support a multi-stream transport (MST) mode, where multiple monitors may each receive a separate display stream from a DP source via a single DP output connector. Using MST, data packets output from the source are each addressed to a particular downstream monitor, which receives and displays the data contained in data packets addressed to that monitor. A DP source device using MST can thus output video or other data which is addressed to each of a plurality of monitors using a single output connector.

SUMMARY OF EMBODIMENT(S)

Some embodiments provide an MST sink device. The MST sink device comprises a receiver configured to communicate with a source device; a transmitter configured to communicate data from the receiver to an external display via a physical link; a logical port configured to communicate data from the receiver to an internal display via a logical link; and, a memory configured to store first configuration data for the physical link and to store second configuration data for the logical link.

Some embodiments provide an MST source device. The MST source device comprises a transmitter configured to communicate data to an external display in communication with the MST sink via a physical link. The transmitter is further configured to communicate data to an internal display of the MST sink via a logical link. The MST source device also comprises a transceiver configured to transmit first configuration data for the physical link to the MST sink for storage in a memory, and to transmit second configuration data for the logical link to the MST sink for storage in the memory.

Some embodiments provide a method for configuring a logical link within an MST sink. A receiver is configured to communicate with a source device. A transmitter is configured to communicate data from the receiver to an external display via a physical link. A logical port is configured to communicate data from the receiver to an internal display via a logical link. A memory is configured to store first configuration data for the physical link and to store second configuration data for the logical link.

Some embodiments provide an MST sink device. The MST sink device comprises a receiver configured to communicate with a source device; a transmitter configured to communicate data from the receiver to an external display via a physical link; a logical port configured to communicate data from the receiver to a display via a non-DisplayPort (DP) link; and, a memory configured to store first configuration data for the physical link and to store second configuration data for the non-DP link.

Some embodiments provide a MST source device. The MST source device comprises a transmitter configured to communicate data to an external display in communication with the MST sink via a physical link. The transmitter is further configured to communicate data to a non-DP display of the MST sink via a non-DP link. The MST source device further comprises a transceiver configured to transmit first configuration data for the physical link to the MST sink for storage in a memory, and to transmit second configuration data for the non-DP link to the MST sink for storage in the memory.

Some embodiments provide a method for configuring a logical link within an MST sink. A receiver is configured to communicate with a source device. A transmitter is configured to communicate data from the receiver to an external display via a physical link. A logical port is configured to communicate data from the receiver to a non-DP display via a non-DP link. A memory is configured to store first configuration data for the physical link and to store second configuration data for the non-DP link.

BRIEF DESCRIPTION OF THE DRAWINGS

A more detailed understanding may be had from the following description, given by way of example in conjunction with the accompanying drawings wherein.

DETAILED DESCRIPTION OF THE PREFERRED EMBODIMENT(S)

Figure 1:
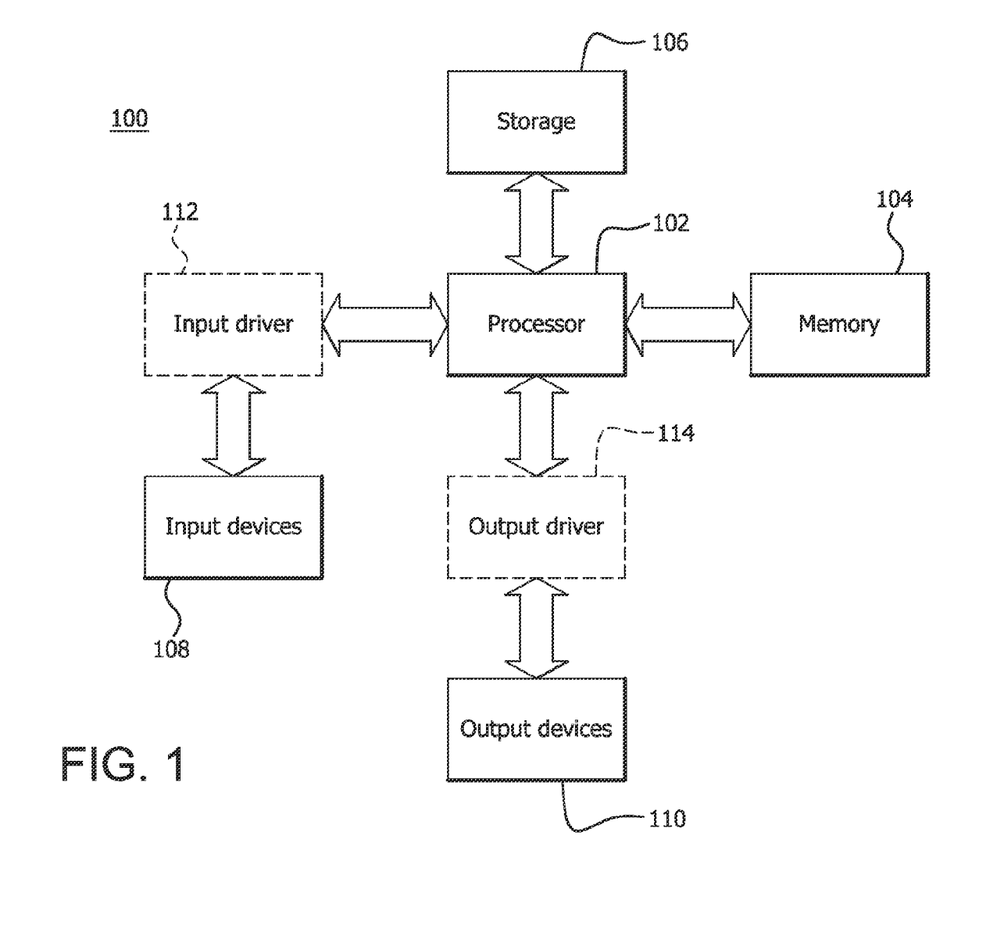
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television (a so-called "smart TV" or not), a mobile phone, or a tablet computer. The device 100 includes a processor 102, a memory 104, a storage device 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache. It is noted that memory 104 may be implemented as one or more discrete units and that device 100 may include multiple distinct memories (not shown). For example, device 100 may include both CPU and GPU memories (not shown) as further discussed herein.

The storage device 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

In some implementations, device 100 may include a DP source, input devices 108 may include a DP sink, and output devices 110 may include a DP transmitter for outputting display or other data from the DP source to a display.

The DP source may use an MST mode to output a plurality of video or other data packets, which may each be addressed to one or more of a plurality of displays (not shown) using a single DP output connector. The displays may be in communication with the DP transmitter via one or more DP links (not shown), and these DP links may be configured by the DP source of device 100 as further discussed herein.

In order for a DP source to output display data to a plurality of monitors using a single output transmitter, DP supports both daisy chain and tree MST connection topologies. In daisy chain topologies, the DP source output may be connected to a DP input of a first daisy chain monitor having at least one internal display which can display data from the DP source. The DP source output may include a DP transmitter which may transmit DP data packets over a main link, a DP transceiver for transmitting and receiving sideband signaling over an auxiliary channel (AUX CH), and a hot plug detect channel (HPD). The DP input of the first daisy chain monitor may include a DP receiver which receives DP main link data packets and a DP transceiver for receiving and transmitting sideband signaling over the AUX CH and HPD.

The first daisy chain monitor may also include a DP output in order to support daisy chain connectivity to a second DP monitor. It is noted that in some implementations the first daisy chain monitor may include a non-DP output to support connectivity for a non-DP monitor in addition to, or instead of, the DP output. A first daisy chain monitor configured to both receive and transmit DP data packets in this way may be referred to as an MST sink.

An input of a second monitor may be connected to the output of the MST sink. If the output of the MST sink is a DP output and the second monitor is also an MST sink, further monitors may be connected via the second monitor to extend the a daisy chain topology. Following appropriate configuration procedures as specified in DP, the DP source may transmit display data packets to both the MST sink and the second monitor via the single source DP output. In a tree topology, the MST sink may include more than one output, each of which may drive another monitor.

The DP input and DP output of the MST sink are physical ports. The connection between the DP output of the first monitor and the DP input of the second monitor is a physical link, and packets destined for the DP input of the second monitor may be addressed to the DP output physical port of the first monitor.

The internal display of the MST sink, in contrast, receives data packets for display via a logical port. The connection between the DP input of the MST sink and the logical port is a logical connection, and packets destined for the internal display may be addressed to the logical port.

Physical links in a DP topology may be configured using DisplayPort configuration data (DPCD), the syntax of which is set forth in the DisplayPort™ standard. DPCD may be stored in an address space within a DP device having a DP receiver, such as an MST sink. DPCD is typically used to supply information regarding DP receiver capability (or of downstream DP receivers) and information regarding the status of the physical link to a DP source via the AUX CH as part of an initial configuration upon connection known as link training. The DP source may also write configuration data to the DPCD, typically for configuring and initializing the physical link. An example of DPCD receiver capability information which may be read by the DP source is MAX_LANE_COUNT, which specifies the maximum number of main link lanes (e.g. 1, 2, or 4 lanes) supported by the DP receiver. If there is another DP receiver downstream from the DP receiver, such as within an external monitor in a daisy chain connection, MAX_LANE_COUNT may specify the lowest common denominator of the two DP receivers. An example of DPCD link configuration information which may be read and written by the DP source includes LINK_BW_SET, which specifies a bandwidth per lane for the link. Any supported bandwidth can be chosen by the DP source as long as it does not exceed the capability of the DP receiver as indicated in the appropriate receiver capability field in the DPCD.

As devices implementing DP have evolved, DPCD has been adapted to store stream related configuration information for implementing stream-embedded features, such as dynamic refresh rate (DRR, also known by the VESA™ brand name "Adaptive Sync™"), display stream compression (DSC) configuration, and panel self-refresh (PSR), as will be discussed further herein.

Figure 2:
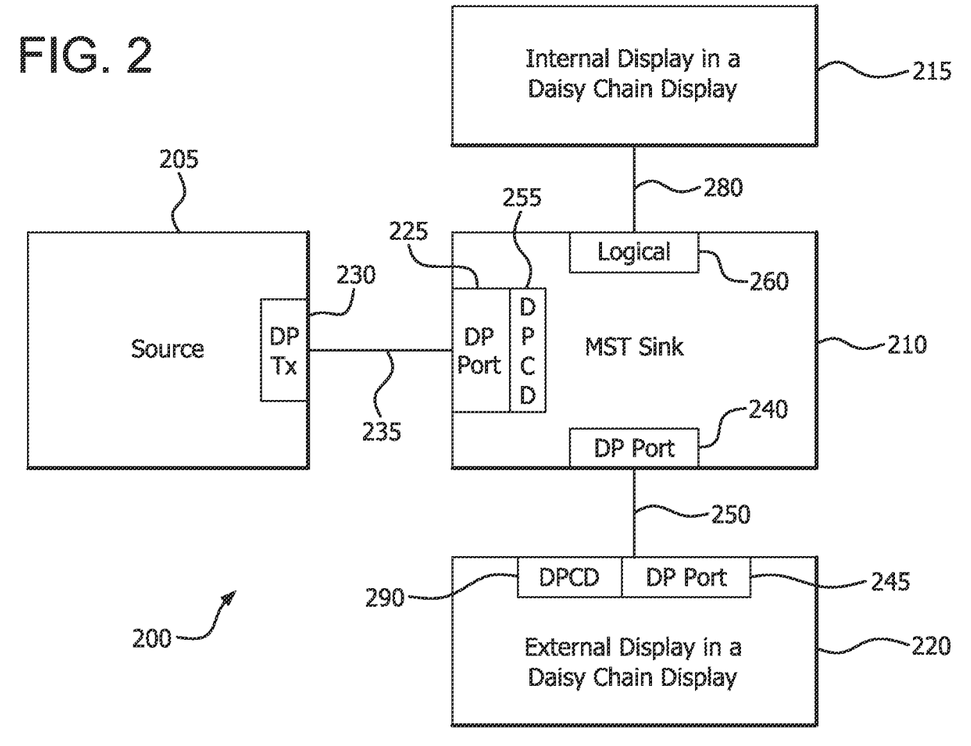
FIG. 2 is a block diagram of an example MST topology usable with the device of FIG. 1 which includes a MST sink having an internal display.

FIG. 2 is a block diagram illustrating an example DP daisy chain topology 200. Topology 200 includes a DP source 205, an MST sink 210 having an internal display 215, and an external display 220.

MST sink 210 includes a DP receiver 225 which is a physical input port of MST sink 210. DP source 205 includes a DP transmitter 230 which is a physical output port of DP source 205. DP transmitter 230 is in communication with DP receiver 225 via link 235. MST sink 210 also includes a DP transmitter 240 which is a physical output port of MST sink 210. External display 220 includes a DP receiver 245 which is a physical input port of external display 220. DP transmitter 240 is in communication with DP receiver 245 via link 250.

External display 220 is in communication with MST sink 210 via a physical DP link 250, and thus the communication link between DP source 205 and external display 220 is configurable using a DPCD 255. It is noted that external display 220 may also include a DPCD 290.

DPCD 255 may be mapped to a DP address space of MST sink 210. DP source 205 may read the receiver capability of MST sink 210 and external display 220, and read the status of links 235 and 250 from DPCD 255. In addition, DP source 205 may write to the link configuration field of DPCD 255 to configure and initialize links 235 and 250. It is noted that DP source 205 may read the receiver capability of external display 220 and read the status of link 250 from DPCD 290 and may write to the link configuration field of DPCD 290 to configure and initialize link 250. It is noted that in some implementations DPCD 255 may reflect the content of DPCD 290 and may be used by DP source 205 in lieu of accessing DPCD 290.

As noted above, internal display 215 is in communication with MST sink 210 via a logical port 260. Accordingly, internal display 215 is a logical device, having a logical link 280 to DP receiver 225. Internal display 215 has no physical port connection with DP receiver 225 and accordingly neither DPCD 255 nor any other DPCD corresponds to or configures the logical link 280.

As discussed above, certain display stream features may be implemented, such as DRR, which require configuration of the links between the source and the display using DPCD. For example, if it is desired to transmit an image data stream from the DP source 205 to external display 220 using DRR, DP source 205 may write appropriate configuration data to DPCD 255 in order to configure DP receiver 245 to receive DRR image data. This is possible because external display 220 has a physical DP link 250 to MST sink 210, and thus DPCD 255 can be configured to support features such as DSC, DRR, and PSR. For example, a given link may be configured for DSC, DRR, or PSR operation by setting a DSC, DRR, or PSR mode field in the DPCD for that link to an enabled or disabled state as appropriate.

Figure 3:
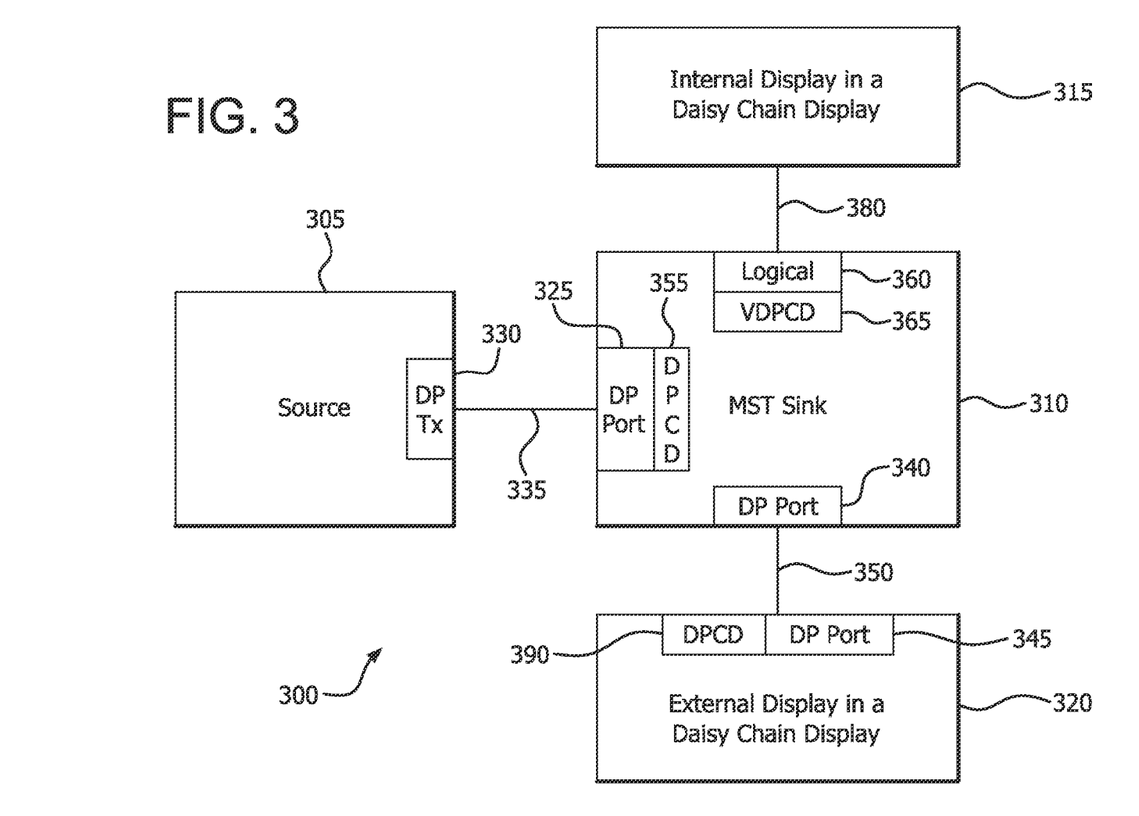
FIG. 3 is a block diagram of another example MST topology usable with the device of FIG. 1 which includes a MST sink having an internal display.

Alternatively, if it were desired to transmit a DSC compressed image data stream from the DP source 205 to internal display 215, DP source 205 could not write appropriate configuration data to DPCD 255 that would configure logical port 260 to receive compressed data. This is because DPCD registers are associated with physical ports (not logical ports) and there is no physical receiver port connection to internal display 215 which could be configured using DPCD 255. Accordingly, a DSC compressed image stream may not be possible to transmit from DP source 205 to internal display 215 using topology 200. FIG. 3 is a block diagram illustrating another example DP daisy chain topology 300. Topology 300 includes a DP source 305, an MST sink 310 having an internal display 315, and an external display 320. Topology 300 is similar to topology 200 as shown in FIG. 2, and includes additional features.

MST sink 310 includes a DP receiver 325 which is a physical input port of MST sink 310. DP source 305 includes a DP transmitter 330 which is a physical output port of DP source 305. DP transmitter 330 is in communication with DP receiver 325 via link 335. MST sink 310 also includes a DP transmitter 340 which is a physical output port of MST sink 310. External display 320 includes a DP receiver 345 which is a physical input port of external display 320. DP transmitter 340 is in communication with DP receiver 345 via link 350.

External display 320 is in communication with MST sink 310 via a physical DP link 350, and thus the communication link between DP source 305 and external display 320 is configurable using a DPCD 355. It is noted that external display 320 may also include a DPCD 390.

DPCD 355 may be mapped to a DP address space of MST sink 310. DP source 305 may read the receiver capability of MST sink 310 and external display 320 and read status of DP link 335 and 350 device from DPCD 355. In addition, DP source 305 may write to the link configuration field of DPCD 355 to configure and initialize links 335 and 350. It is noted that DP source 305 may read the receiver capability of external display 320 and read the status of link 350 from DPCD 390 and may write to the link configuration field of DPCD 390 to configure and initialize link 350. It is noted that in some implementations DPCD 355 may reflect the content of DPCD 390 and may be used by DP source 305 in lieu of accessing DPCD 390.

Internal display 315 however is in communication with MST sink 310 via a logical port 360. Accordingly, internal display 315 is a logical device, having a logical communication link 380 DP receiver 325. Internal display 315 has no physical port connection with DP receiver 325 and accordingly neither DPCD 355 nor any other DPCD corresponds to or configures the logical link 380.

As discussed above, certain display stream features, such as DSC, require configuration of the links between the source and the display using DPCD. For example, if it is desired to transmit a compressed image data stream from the DP source 305 to external display 320 using DSC, DP source 305 may write appropriate DSC configuration data to DPCD 355 in order to configure DP receiver 345 to receive compressed data. This is possible because external display 320 has a physical DP link 350 to MST sink 310, and thus DPCD 355 can be configured to support features such as DSC, DRR, and PSR.

On the other hand, if it were desired to transmit a DSC compressed image data stream from the DP source 305 to internal display 315, DP source 305 could not write appropriate configuration data to DPCD 355 that would configure logical port 360 to receive compressed data. This is because DPCD registers are associated with physical ports and there is no physical receiver port connection to internal display 315 which could be configured using DPCD 355.

Accordingly, MST sink 310 includes a "virtual" DPCD (VDPCD) 365 associated with logical port 360. VDPCD 365 may be similar to DPCD 355 in that it may follow the same syntax and contain all or a portion of the same fields as DPCD 355. In particular, VDPCD 365 may include configuration data required for implementing DSC to transmit a DSC compressed image data stream from source 305 to internal display 315. VDPCD 365 may also or instead include configuration data for other stream-embedded functions such as DRR and DSC, PSR, or other suitable functions. Thus, VDPCD 365 may "virtualize" at least a part of the functionality of DPCD 355 for logical port 360. It is noted that VDPCD 365 or a different VDPCD (not shown) could be associated with other logical ports (not shown) within MST sink 310, such as for a second internal display, picture-in-picture (PIP) display, or secondary data stream sink supported in DP such as a USB port or audio output (not shown).

VDPCD 365 may be mapped to an address space which may be separate from the address space to which DPCD 355 is mapped. Support for VDPCD 365 may be indicated to DP source 305 using any suitable method, for example, as a field in DPCD 355 which may be read by DP source 305 during link training or at another suitable time, for example using a remote DPCD call such as REMOTE_DPCD_READ. DP source 305 may issue a remote DPCD read or write command, such as REMOTE_DPCD_READ or REMOTE_DPCD_WRITE with a destination node targeted at logical port 360. The MST sink 310 may interpret the remote DPCD read or write command and configure the logical port 360 based on the received source setting of VDPCD 365. MST sink 310 may store a field state of VDPCD 365 on a per-endpoint basis (i.e. for each logical port or other relevant endpoint as discussed further herein). If DP source 305 queries the state of logical link 380 via a remote DPCD side band message for example, MST sink 310 may return the saved field state of the VDPCD 365.

It is noted that on a power reset or source disconnect VDPCD may be reset to a default state.

Figure 4:
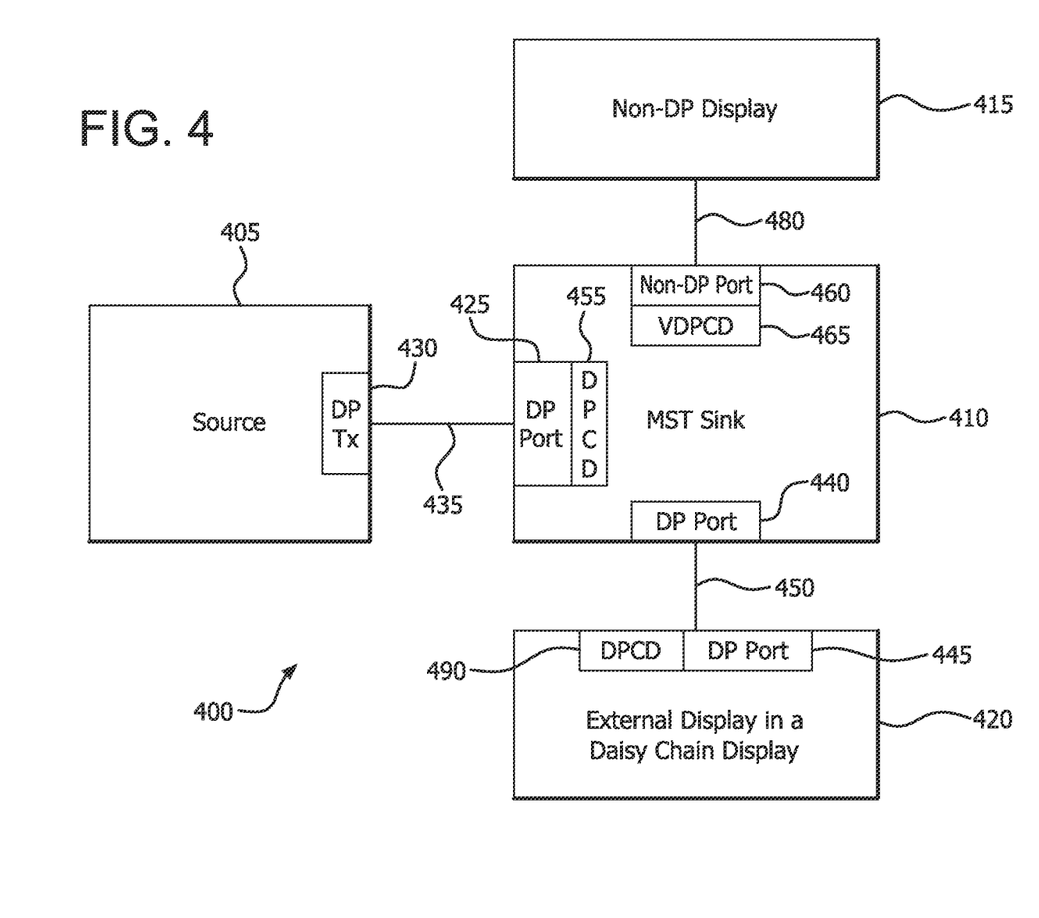
FIG. 4 is a block diagram of another example MST topology usable with the device of FIG. 1 which includes a non-DP end point.

FIG. 4 is a block diagram illustrating another example DP daisy chain topology 400. Topology 400 includes a DP source 405, an MST sink 410 having non-DP display 415, and an external display 420. Topology 400 is similar to topologies 200 as shown in FIG. 2, and includes additional features.

MST sink 410 includes a DP receiver 425 which is a physical input port of MST sink 410. DP source 405 includes a DP transmitter 430 which is a physical output port of DP source 405. DP transmitter 430 is in communication with DP receiver 425 via link 435. MST sink 410 also includes a DP transmitter 440 which is a physical output port of MST sink 410. External display 420 includes a DP receiver 445 which is a physical input port of external display 420. DP transmitter 440 is in communication with DP receiver 445 via link 450.

External display 420 is in communication with MST sink 410 via a physical DP link 450, and thus the communication link between source 405 and external display 420 is configurable using a DPCD 455. It is noted that external display 220 may also include a DPCD 490.

DPCD 255 may be mapped to a DP address space of MST sink 410. DP source 405 may read the receiver capability of MST sink 410 and external display 420 and read status of DP link 435 and 450 device from DPCD 455. In addition, DP source 405 may write to the link configuration field of DPCD 455 to configure and initialize links 435 and 450. It is noted that DP source 405 may read the receiver capability of external display 420 and read the status of link 450 from DPCD 490 and may write to the link configuration field of DPCD 490 to configure and initialize link 450. It is noted that in some implementations DPCD 455 may reflect the content of DPCD 490 and may be used by DP source 405 in lieu of accessing DPCD 490.

Non-DP display 415 however is in communication with MST sink 410 via a non-DP port 460. Accordingly, non-DP display 415 has no DP receiver, and accordingly neither DPCD 455 nor any other DPCD corresponds to or configures the non-DP link 480.

As discussed above, certain display stream features, such as DSC, require configuration of the links between the source and the display using DPCD. For example, if it is desired to transmit a compressed image data stream from the source 405 to external display 420 using DSC, source 405 may write appropriate DSC configuration data to DPCD 455 in order to configure DP receiver 445 to receive compressed data. This is possible because external display 420 has a physical DP link 450 to MST sink 410, and thus DPCD 455 can be configured to support features such as DSC, DRR, and PSR.

Alternatively, if it were desired to transmit a DSC compressed image data stream from the source 405 to non-DP display 415, source 405 could not write appropriate configuration data to DPCD 455 that would configure non-DP port 460 to receive compressed data. This is because DPCD registers are associated with physical DP ports and there is no physical DP receiver port connection to non-DP display 415 which could be configured using DPCD 455.

Accordingly, MST sink 410 includes a "virtual" DPCD (VDPCD) 465 associated with non-DP port 460. VDPCD 465 may be similar to DPCD 455 in that it may follow the same syntax and contain all or a portion of the same fields as DPCD 455. In particular, VDPCD 465 may include configuration data required for implementing DSC to transmit a DSC compressed image data stream from source 405 to non-DP display 415. VDPCD 465 may also or instead include configuration data for other stream-embedded functions such as DRR and DSC, PSR, or other suitable functions. Thus, VDPCD 465 may "virtualize" at least a part of the functionality of DPCD 455 for non-DP port 460. It is noted that VDPCD 465 could be associated with other non-DP ports or logical ports (not shown) within MST sink 410, such as for a second non-DP display, an internal display, picture-in-picture (PIP) display, or secondary data stream sink supported in DP such as a USB port or audio output (not shown).

VDPCD 465 may be mapped to a DP address space which may be separate from a DP address space to which DPCD 455 is mapped. Support for VDPCD 465 may be indicated to DP source 405 using any suitable method, for example, as a field in DPCD 455 which may be read by DP source 405 during link training or at another suitable time. Source 405 may set up a remote DPCD read or write command with a destination node targeted at non-DP port 460. The MST sink 410 may interpret the remote DPCD read or write command and configure the non-DP port 460 based on the source setting of VDPCD 465. MST sink 410 may store a field state of VDPCD 465 on a per-endpoint basis (i.e. for each non-DP port, logical port or other relevant endpoint). If DP source 405 queries the state of non-DP link 480 via a remote DPCD side band message for example, MST sink 410 may return the saved field state of the VDPCD 465.

It is noted that on a power reset or source disconnect VDPCD may be reset to a default state.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A multi-stream transport (MST) sink device comprising:
   a receiver communicatively coupled to a source device by a Source Display Port, wherein the receiver receives packetized data;
   an Output Display Port communicatively coupled to a first display via a physical link;
   a logical port communicatively coupled to a second display via a logical link;
   a memory, wherein the memory stores DisplayPort Configuration Data (DPCD) associated with the Output Display Port and stores Virtual DPCD (VDPCD) associated with the logical port; and
   a transmitter, wherein the transmitter:
   selectively transmits the packetized data to the first display via the physical link based on the DPCD, and
   selectively transmits the packetized data to the second display via the logical link based on the VDPCD, wherein the VDPCD comprises information for configuring the second display to display the packetized data.

2. The MST sink device of claim 1, wherein the memory further comprises a DisplayPort data address space.

3. The MST sink device of claim 1, wherein the VDPCD conforms at least partly to DPCD syntax.

4. The MST sink device of claim 1, wherein
   the receiver further receives a query from the source;
   wherein the memory further stores a saved field state of the VDPCD; and
   wherein the transmitter further, in response to the query, transmits the saved field state to the source via the Source Display Port.

5. The MST sink device of claim 1, wherein the VDPCD further comprises information for configuring the second display to receive data compressed using display stream compression (DSC).

6. The MST sink device of claim 1, wherein the VDPCD comprises information for configuring the second display for a dynamic refresh rate (DRR).

7. The MST sink device of claim 1, wherein the receiver further receives the VDPCD via a remote DPCD write message.

8. The MST sink device of claim 1, wherein the VDPCD further comprises information for configuring the second display for panel self-refresh (PSR).

9. A multi-stream transport (MST) source device comprising:
   a transmitter communicatively coupled to:
   a first display via an MST sink, wherein the MST sink is communicatively coupled to the first display over a physical link, and
   a second display via the MST sink, wherein the MST sink is communicatively coupled to the second display over a logical link; and,
   a transceiver, wherein the transceiver:
   transmits DisplayPort Configuration Data (DPCD) for the physical link to the MST sink for storage in a memory, and
   transmits virtual DPCD (VDPCD) for the logical link to the MST sink for storage in the memory.

10. The MST source device of claim 9, wherein the memory comprises a DisplayPort data address space.

11. The MST source device of claim 9, wherein the VDPCD conforms at least partly to DPCD syntax.

12. The MST source device of claim 9, wherein the transceiver further:
    transmits a query to the MST sink; and
    receives a response to the query from the MST that indicates a saved field state of the VDPCD.

13. The MST source device of claim 9, wherein the VDPCD further comprises information for configuring the second display to receive data compressed using display stream compression (DSC).

14. The MST source device of claim 9, wherein the VDPCD further comprises information for configuring the second display for a dynamic refresh rate (DRR).

15. The MST source device of claim 9, wherein the VDPCD further comprises information for configuring the second display for panel self-refresh (PSR).

16. The MST source device of claim 9, wherein the VDPCD is transmitted via a remote DPCD write message.

17. A method for communicating with a first display and a second display via a multi-stream transport (MST) sink, the method comprising:
    receiving, from a source device DisplayPort Configuration Data (DPCD) associated with a physical link of the MST sink and Virtual DPCD (VDPCD) associated with a logical link of the MST sink;
    storing, in a memory of the MST sink, the DPCD and VDPCD;
    receiving, by the MST sink, packetized data transmitted by the source, wherein the VDPCD comprises information for configuring the second display to display the packetized data;
    selectively transmitting, by the MST sink, the packetized data to the first display via the physical link based on the DPCD; and
    selectively transmitting, by the MST sink, the packetized data to the second display via the logical link based on the VDPCD.

18. The method of claim 17, further comprising configuring the memory of the MST sink to store a DisplayPort data address space.

19. The method of claim 17, wherein the VDPCD conforms at least partly to DPCD syntax.

20. The method of claim 17, further comprising:
    storing, in the memory of the MST sink, a saved field state of the VDPCD;
    receiving, by the MST sink, a query from the source; and
    transmitting, by the MST sink, in response to the query the saved field state of the VDPCD.

21. The method of claim 17, wherein the VDPCD further comprises information for configuring the second display to receive data compressed using display stream compression (DSC).

22. The method of claim 17, wherein the VDPCD further comprises information for configuring the second display for a dynamic refresh rate (DRR).

23. The method of claim 17, wherein the VDPCD further comprises information for configuring the second display for panel self-refresh (PSR).

24. The method of claim 17, further comprising receiving, by the MST sink, the VDPCD from the source via a remote DPCD write message.

25. A multi-stream transport (MST) sink device comprising:
a receiver communicatively coupled to a source device, wherein the receiver receives packetized data;
an Output Display Port communicatively coupled to a first display via a physical link;
a logical port commutatively coupled to a non-DP display via a non-DisplayPort (DP) link;
a memory, wherein the memory stores DisplayPort Configuration Data (DPCD) associated with the Output Display Port and stores Virtual DPCD (VDPCD) associated with the logical port, wherein the VDPCD comprises information for configuring the non-DP display to display the packetized data; and
a transmitter, wherein the transmitter:
selectively transmits the packetized data to the first display via the physical link based on the DPCD, and
selectively transmits the packetized data to the non-DP display via the logical link based on the VDPCD.

26. The MST sink device of claim 25, wherein the memory further comprises a DisplayPort data address space.

27. The MST sink device of claim 25, wherein the VDPCD conforms at least partly to DPCD syntax.

28. The MST sink device of claim 25, wherein
the receiver further receives a query from the source;
wherein the memory further stores a saved field state of the VDPCD; and
wherein the transmitter further, in response to the query, transmits the saved field state to the source.

29. The MST sink device of claim 25, wherein the VDPCD further comprises information for configuring the non-DP display to receive data compressed using display stream compression (DSC).

30. The MST sink device of claim 25, wherein the VDPCD further comprises information for configuring the non-DP display for a dynamic refresh rate (DRR).

31. The MST sink device of claim 25, wherein the VDPCD further comprises information for configuring the non-DP display for panel self-refresh (PSR).

32. The MST sink device of claim 25, wherein the VDPCD is received via a remote DPCD write message.

33. A multi-stream transport (MST) source device comprising:
a transmitter communicatively coupled to:
a first display via an MST sink, wherein the MST sink is communicatively coupled to the first display over a physical link, and
a non-DP display via the MST sink, wherein the MST sink is communicatively coupled to the non-DP display via a non-DP link; and,
a transceiver, wherein the transceiver:
transmits DisplayPort Configuration Data (DPCD) for the physical link to the MST sink for storage in a memory, and
transmits virtual DPCD (VDPCD) for the non-DP link to the MST sink for storage in the memory.

34. The MST source device of claim 33, wherein the memory further comprises a DisplayPort data address space.

35. The MST source device of claim 33, wherein the VDPCD conforms at least partly to DPCD syntax.

36. The MST source device of claim 33, wherein the transceiver further:
transmits a query to the MST sink; and
receives a response to the query from the MST that indicates a saved field state of the VDPCD.

37. The MST source device of claim 33, wherein the VDPCD further comprises information for configuring the non-DP display to receive data compressed using display stream compression (DSC).

38. The MST source device of claim 33, wherein the VDPCD further comprises information for configuring the non-DP display for a dynamic refresh rate (DRR).

39. The MST source device of claim 33, wherein the VDPCD further comprises information for configuring the non-DP display for panel self-refresh (PSR).

40. The MST source device of claim 33, wherein the VDPCD is transmitted via a remote DPCD write message.

41. A method for communicating with a DP display and a non-DP display via a multi-stream transport (MST) sink, the method comprising:
receiving, from a source device DisplayPort Configuration Data (DPCD) associated with a physical link of the MST sink and Virtual DPCD (VDPCD) associated with a non-DP link of the MST sink;
storing, in a memory of the MST sink, the DPCD and VDPCD;
receiving, by the MST sink, packetized data transmitted by the source, wherein the VDPCD comprises information for configuring the non-DP display to display the packetized data;
selectively transmitting, by the MST sink, the packetized data to the DP display via the physical link based on the DPCD; and
selectively transmitting, by the MST sink, the packetized data to the non-DP display via the non-DP link based on the VDPCD.

42. The method of claim 41, further comprising configuring the memory of the MST sink to store a DisplayPort data address space.

43. The method of claim 41, wherein VDPCD conforms at least partly to DPCD syntax.

44. The method of claim 41,
storing, in the memory of the MST sink, a saved field state of the VDPCD;
receiving, by the MST sink, a query from the source; and
transmitting, by the MST sink, in response to the query the saved field state of the VDPCD.

45. The method of claim 41, wherein the VDPCD further comprises information for configuring the non-DP display to receive data compressed using display stream compression (DSC).

46. The method of claim 41, wherein the VDPCD further comprises information for configuring the non-DP display for a dynamic refresh rate (DRR).

47. The method of claim 41, wherein the VDPCD further comprises information for configuring the non-DP display for panel self-refresh (PSR).

48. The method of claim 41 further comprising:
receiving, by the MST sink, the VDPCD from the source a remote DPCD message.

* * * * *